(12) United States Patent
McManus

(10) Patent No.: US 6,681,531 B2
(45) Date of Patent: Jan. 27, 2004

(54) TWIN MOTOR DRIVE FOR A SLIDE-OUT ROOM

(75) Inventor: Patrick W. McManus, Osceola, IN (US)

(73) Assignee: VT Holdings II, Inc., Reno, NV (US)

( * ) Notice: Subject to any disclaimer, the term of this patent is extended or adjusted under 35 U.S.C. 154(b) by 135 days.

(21) Appl. No.: 09/940,560

(22) Filed: Aug. 28, 2001

(65) Prior Publication Data
US 2002/0023393 A1 Feb. 28, 2002

Related U.S. Application Data

(63) Continuation-in-part of application No. 09/167,105, filed on Oct. 6, 1998.

(51) Int. Cl.[7] .................................................. B60P 3/34
(52) U.S. Cl. ......................... 52/67; 52/143; 296/26.13; 296/175; 296/26.01
(58) Field of Search .................. 52/67, 143; 296/26.13, 296/26.14, 26.12, 26.09, 26.08, 26.01, 165, 171, 175, 176

(56) References Cited

U.S. PATENT DOCUMENTS

| | | | |
|---|---|---|---|
| 1,238,297 A | | 8/1917 | Johanson |
| 2,831,722 A | | 4/1958 | Hanson et al. |
| 2,842,972 A | * | 7/1958 | Houdart ........................ 72/422 |
| 3,046,047 A | | 7/1962 | Ferrera |
| 3,070,850 A | | 1/1963 | McClure, Sr. |
| 3,106,750 A | | 10/1963 | Jarman |
| 3,572,809 A | | 3/1971 | Buland |
| 3,915,492 A | | 10/1975 | Agnese |
| 4,133,571 A | * | 1/1979 | Fillios ........................ 296/165 |
| 4,930,837 A | | 6/1990 | Marsh et al. |
| 5,090,749 A | | 2/1992 | Lee |
| 5,127,697 A | * | 7/1992 | St. Marie ................ 296/26.09 |
| 5,154,469 A | | 10/1992 | Morrow |
| 5,237,782 A | | 8/1993 | Cooper |
| 5,295,430 A | | 3/1994 | Dewald, Jr. et al. |
| 5,398,986 A | | 3/1995 | Koob |
| 5,491,933 A | | 2/1996 | Miller et al. |
| 5,577,351 A | | 11/1996 | Dewald, Jr. et al. |
| 5,586,802 A | | 12/1996 | Dewald, Jr. et al. |
| 5,634,683 A | | 6/1997 | Young |
| 5,706,612 A | | 1/1998 | Tillett |
| 5,758,918 A | * | 6/1998 | Schneider et al. ........ 296/26.13 |
| 5,772,270 A | | 6/1998 | Hanser et al. |
| 5,785,373 A | | 7/1998 | Futrell et al. |
| 5,791,715 A | | 8/1998 | Nebel |
| 5,794,547 A | * | 8/1998 | Dallman et al. .............. 109/50 |
| 5,833,296 A | | 11/1998 | Schneider |

(List continued on next page.)

FOREIGN PATENT DOCUMENTS

| | | |
|---|---|---|
| CA | 2136673 | 11/1994 |
| DE | 1.230.140 | 10/1965 |
| FR | 1.107.260 | 8/1955 |
| FR | 1.470.553 | 3/1966 |
| GB | 1.403.328 | 8/1975 |

*Primary Examiner*—Jeanette Chapman
(74) *Attorney, Agent, or Firm*—Baker & Daniels

(57) ABSTRACT

The present invention provides a drive mechanism for a slide-out room including a support rail for mounting under the slide-out room and moving through a guide mounted to the vehicle. The support rail includes a rack which is driven by a pinion gear mounted within the guide. A pair of motors turn the pinion gear to drive the room between the extended and retracted position. According to one embodiment of the invention, the drive mechanism is attached to the vehicle floor and disposed almost entirely within a cavity formed in the room floor. A pair of bevel gears connected to the pinion gear extend from the guide and mate with a corresponding pair of bevel gears driven by the pair of motors. Accordingly, the motors, which cooperate to provide the power needed to move the room, may also be disposed within the room floor.

8 Claims, 9 Drawing Sheets

U.S. PATENT DOCUMENTS

| | | | |
|---|---|---|---|
| 5,857,733 A | | 1/1999 | Dewald, Jr. et al. |
| 5,902,001 A | * | 5/1999 | Schneider ................ 296/26.13 |
| 5,984,396 A | * | 11/1999 | Schneider ................ 296/26.14 |
| 6,067,756 A | | 5/2000 | Frerichs et al. |
| 6,116,671 A | * | 9/2000 | Schneider ................ 296/26.01 |
| 6,152,520 A | | 11/2000 | Gardner |
| 6,286,883 B1 | * | 9/2001 | Schneider et al. ....... 296/26.14 |
| 6,293,611 B1 | * | 9/2001 | Schneider et al. .......... 296/171 |
| 6,305,739 B1 | * | 10/2001 | Corona ....................... 296/165 |
| 6,402,216 B1 | * | 6/2002 | McManus et al. ........ 296/26.14 |
| 6,415,675 B1 | * | 7/2002 | Schneider et al. .......... 74/411.5 |
| 6,536,823 B2 | * | 3/2003 | McManus ................ 296/26.13 |
| 6,572,170 B2 | * | 6/2003 | McManus et al. ....... 296/26.13 |
| 6,575,514 B2 | * | 6/2003 | McManus et al. ....... 296/26.01 |
| 6,592,163 B1 | * | 7/2003 | Nebel ..................... 296/26.01 |
| 6,601,896 B1 | * | 8/2003 | Nye et al. ................ 296/26.13 |

\* cited by examiner

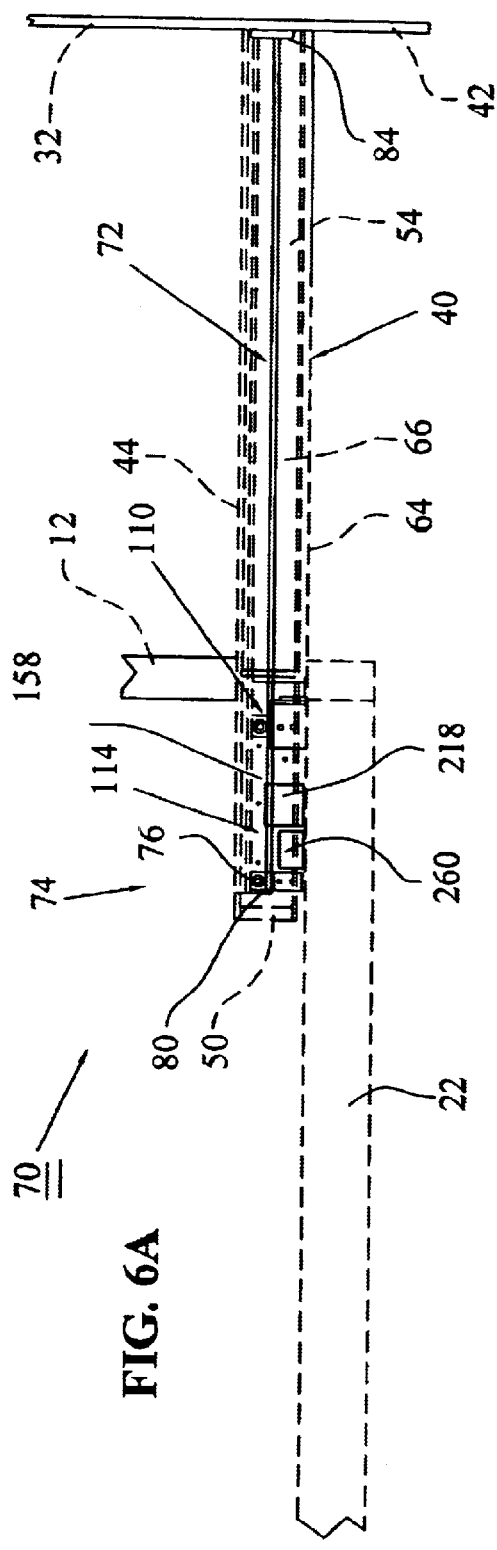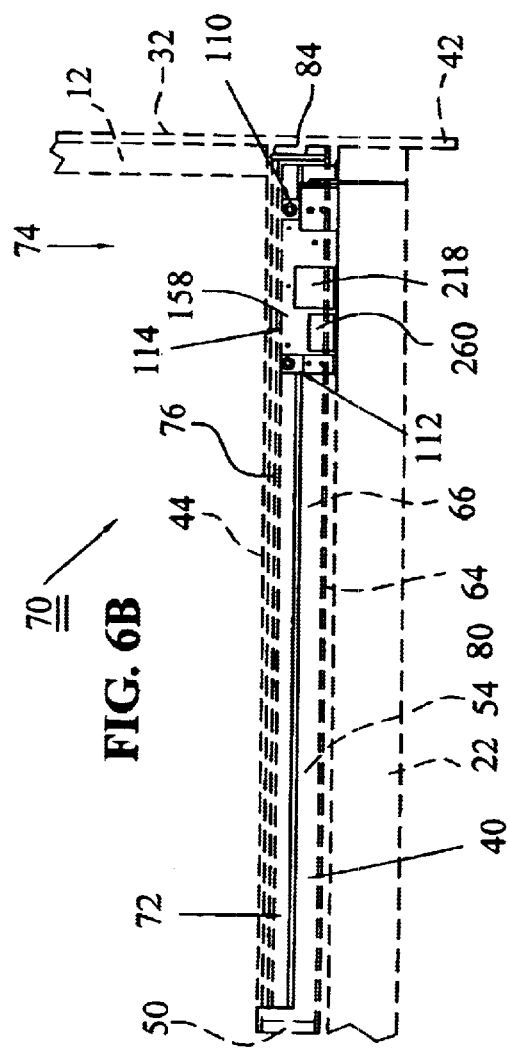
FIG. 6A
FIG. 6B

TWIN MOTOR DRIVE FOR A SLIDE-OUT ROOM

This application is a Continuation-In-Part application of Ser. No. 09/167,105, filed Oct. 6, 1998.

BACKGROUND OF THE INVENTION

1. Field of the Invention

This invention generally relates to a drive mechanism for a slide-out room of a mobile living quarters (such as a recreational vehicle), and more specifically to a rack and pinion drive mechanism using two or more motors to move the slide-out room between an extended and a retracted position.

2. Discussion of the Prior Art

The width of mobile living quarters, such as recreational vehicles, is limited by maximum width requirements of highway regulations. Accordingly, it is desirable to increase or expand the width of the vehicle, when parked for use, to increase the overall living space within the vehicle. Various slide-out rooms have been developed to provide this increased living space. Such rooms generally are retracted into the main living area of the vehicle during travel, and extended laterally from the vehicle to increase its width when the vehicle is parked for use. Typically, a pair of telescopic supporting members are mounted between the frame of the vehicle and the room and drive mechanisms, which are actuated manually, hydraulically, mechanically, or electrically, slide the room laterally relative to the vehicle between the extended and retracted positions.

Many such drive mechanisms require special mounting hardware or necessitate structural modifications to the vehicle during installation. Additionally, drive mechanisms are typically located below the slide-out room, under the vehicle floor, an otherwise desirable storage location. Moreover, since a substantial amount of power may be required to move a slide-out room between the extended and retracted positions, many drive mechanisms are rather large and cannot fit in more desirable locations, for example, within or above the vehicle floor.

Most slide-out rooms are also merely supported on the main room floor. Thus, movement of the slide between the extended and retracted positions causes unsightly wear patterns on the flooring (typically carpeting) of the main room floor.

The objects of the invention are therefore to provide solutions to the shortcomings of the prior art.

SUMMARY OF THE INVENTION

The objects of the invention have been accomplished by providing a recreational vehicle comprising a main room portion and an expandable portion extendable from the main room portion to enlarge the living area of the main room portion. The expandable portion is movable through an opening in a side wall of the main room portion by way of an actuator mechanism between extended and retracted positions. The expandable portion has a floor movable over a floor of the main room, and the actuator is positioned in a channel between the main room floor and the expandable room floor and comprises a support rail mounted to one of the floors and a guide member mounted to the other of the floors, to support the expandable rooms between the extended and retracted positions. A drive mechanism is cooperable between the support rail and guide member to drive the expandable room portion between the extended and retracted positions.

In the preferred embodiment of the invention, the channel is defined within the expandable room floor as a downwardly opening channel which opens onto the main room floor. In an alternate embodiment of the invention, the channel is defined within the main room floor as an upwardly opening channel which opens onto a bottom surface of the expandable room floor.

Also in the preferred embodiment of the invention, the support rail is mounted to the expandable room floor, and the guide is mounted to the main room floor. The drive mechanism comprises twin drive motors for driving the expandable portion. The guide member is comprised of a pair of channels having openings facing in opposite directions, and the guide member comprises a slot to receive the channels, and support rollers to support the support rail. The support rail further comprises a rack gear mounted intermediate the channels and a guide member further comprises a pinion gear assembly, driven by the twin drive motors. A gear box is mounted intermediate the pinion gear assembly and the twin drive motors. The pinion gear assembly is comprised of a shaft mounted in the guide member, and a pinion gear mounted to the shaft in alignment with the rack gear. The twin drive motors drive opposite ends of the shaft.

In another embodiment of the invention, a recreational vehicle comprises a main room portion, and an expandable portion extendable from the main room portion to enlarge the living area of the main room portion. The expandable portion is movable through an opening in a sidewall of the main living portion, and has an actuator mechanism for moving the expandable portion between extended and retracted positions. The expandable portion has a floor movable over a floor of the main room, with the actuator being positioned in a channel between the main room floor and the expandable room floor. A support mechanism supports the expandable portion between the extended and retracted positions, and a drive mechanism is positioned with the channel to drive the expandable room portion between the extended and retracted positions.

In the preferred embodiment of the invention, the channel is defined within the expandable room floor as a downwardly opening channel which opens onto the main room floor. In an alternate embodiment of the invention, the channel is defined within the main room floor as an upwardly opening channel which opens onto a bottom surface of the expandable room floor.

Also in the preferred embodiment of the invention, the support rail is mounted to the expandable room floor, and the guide is mounted to the main room floor. The drive mechanism further comprises twin drive motors for driving the expandable room. The guide member is comprised of a pair of channels having openings facing in opposite directions, and the guide member comprises a slot to receive the channels, and support rollers to support the support rail. The guide member comprises a rack gear mounted intermediate the channels and the guide member comprises a pinion gear assembly, driven by the twin drive motors. The pinion gear assembly is comprised of a shaft mounted in the guide member, and a pinion gear mounted to the shaft in alignment with the rack gear. The twin drive motors drive opposite ends of the shaft.

In yet another embodiment of the invention, an actuator member is provided for moving an expandable room portion between fully extended and fully retracted positions in a vehicle room. The actuator member comprises an elongate support rail mountable to the slide-out room floor, the support includes guide ways extending over a substantial length of the elongate support rail. A drive guide mechanism is mountable to a fixed room floor of the vehicle room, having first and second members receivable in the guide ways, and spaced apart along an axis of movement of the support rail. A powerdrive mechanism is positioned adjacent to the drive guide mechanism. A first drive mechanism is rotatably positioned in the drive guide mechanism, and coupled to the power drive mechanism and a second drive mechanism is fixed to the support rail and is driven by the first drive mechanism.

The power drive mechanism is comprised of at least one motor, and preferably the power mechanism is comprised of twin motors. The support rail is comprised of a mounting plate with channels positioned on a lower surface with elongate openings facing outwardly. The drive guide mechanism comprises first and second sets of rollers profiled for receipt in the channel. The first drive mechanism is a pinion gear mounted to a rotatable shaft, mounted with an axis of rotation transverse to the axis of movement of the support rail. The second drive mechanism is a rack gear positioned intermediate the channels.

BRIEF DESCRIPTION OF THE DRAWINGS

The present invention will be better understood upon reference to the following description when considered in conjunction with the accompanying drawings wherein:

FIG. 6A shows a side view of the drive mechanism shown in the fully extended position;

FIG. 6B shows a side view of the drive mechanism shown in the fully retracted position;

DETAILED DESCRIPTION OF EMBODIMENTS OF THE INVENTION

The embodiments of the invention described herein are not intended to be exhaustive or to limit the invention to the precise forms disclosed. Rather, the selected for description have been chosen to enable one skilled in the art to practice the invention.

Figure 1:
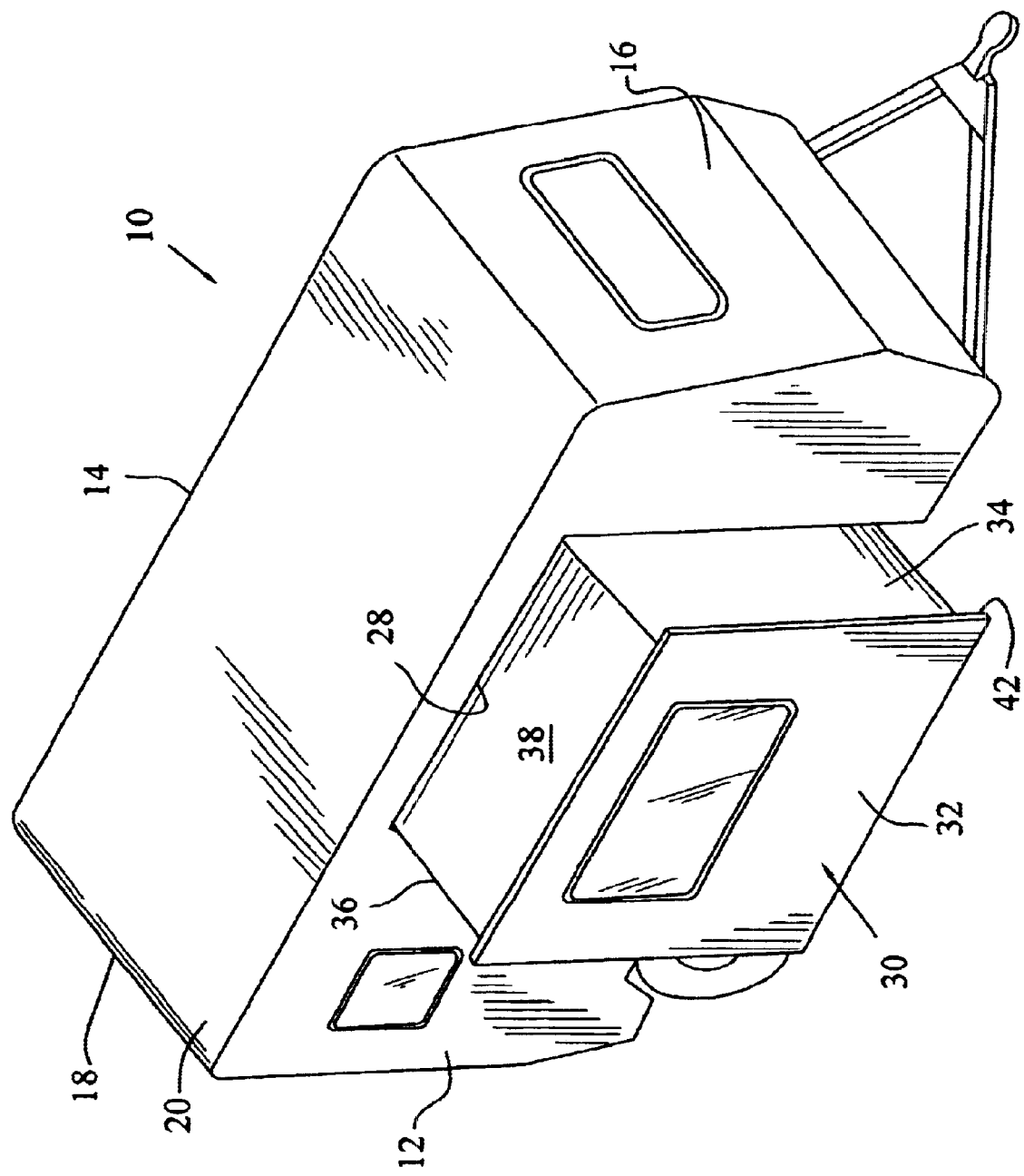
FIG. 1 is a perspective view of a vehicle incorporating a slide-out room according to the present invention.
Figure 2:
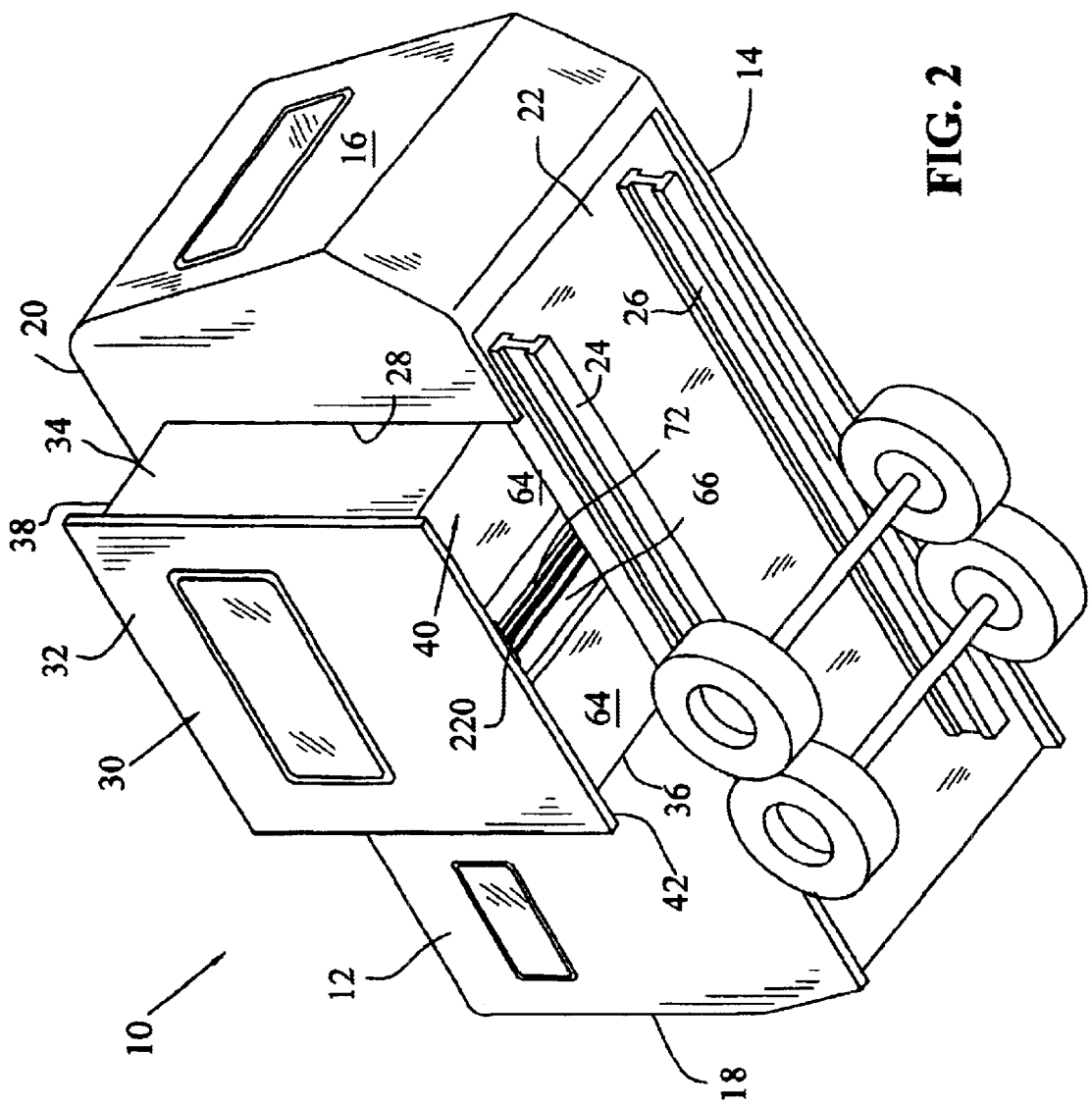
FIG. 2 is a lower perspective view.

Referring now to FIGS. 1 and 2, mobile living quarters, such as a recreational vehicle, generally indicated by the numeral 10, includes side walls 12, 14, end walls 16, 18, a ceiling 20, and a floor 22 (FIG. 2) which is supported on a frame including a pair of frame members 24, 26 that extend substantially parallel to the longitudinal axis of vehicle 10.

Side wall 12 of vehicle 10 includes an opening 28 which receives an expandable area, typically referred to as a slide-out room, generally indicated by the numeral 30. Room 30 is mounted for movement relative to side wall 12 between an extended position (illustrated in FIGS. 1 and 2) in which slide-out room 30 is positioned laterally outwardly relative to vehicle 10 to provide auxiliary living space, and a retracted position, retracted within vehicle 10 to reduce the width of vehicle 10 for travel. Slide-out room 30 includes a back wall 32 which, when room 30 is retracted into vehicle 10, is substantially flush with side wall 12. Slide-out room 30 also includes end walls 34, 36, a ceiling 38, and a floor 40 (FIG. 2). It should be noted that back wall 32 extends horizontally beyond end walls 34, 36, and vertically below floor 40 and above ceiling 38, thereby defining a fascia 42 to permit the use of weather stripping or other similar structure to prevent ingress of the elements into the interior living space of vehicle 10 when slide-out room 30 is in its retracted position during travel.

Figure 3:
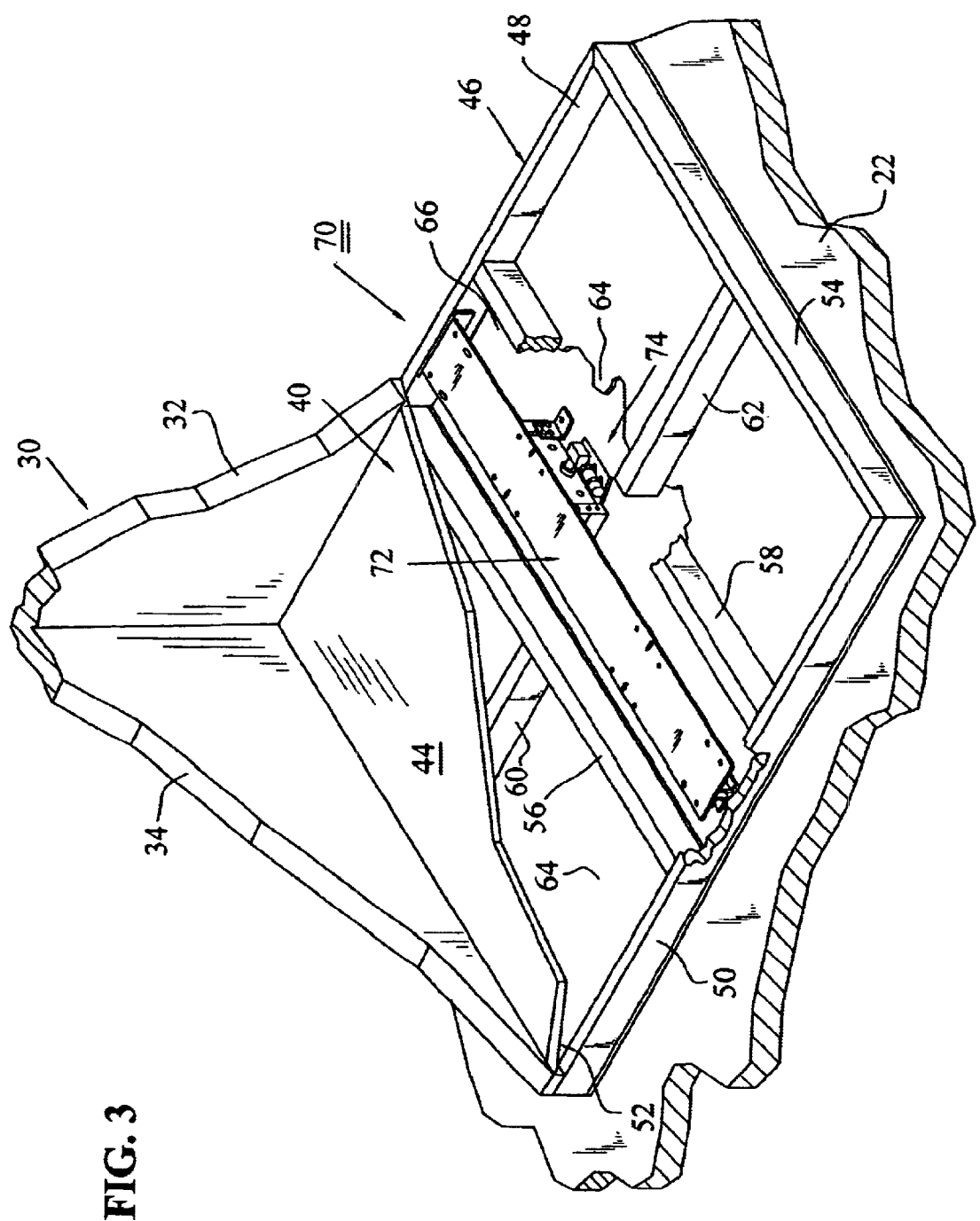
FIG. 3 is a perspective view, in partial fragmentation, showing the slide-out room and drive mechanism according to the present invention.

Referring now to FIG. 3, room 30 is shown partially fragmented to illustrate the structure of room floor 40, and the view is taken from the perspective from inside the main living area within the vehicle. Floor 40 includes an upper layer 44 mounted to a framework generally indicated by the numeral 46. Framework 46 includes a forward member 48, a rearward member 50, and a pair of end members 52, 54, together forming a rectangular frame for floor 40. A pair of parallel inner frame members 56, 58 extend perpendicularly between rearward member 48 and forward member 50, and parallel to the direction of travel of the room 30. A brace 60 extends perpendicularly between end member 52 and inner member 56. Similarly, a brace 62 extends perpendicularly between end member 54 and inner member 58. All of the components of framework 46 are attached to one another using standard fastening methods such as nails, screws, and adhesive.

A lower layer 64 is attached to the lower side of framework 46 and spans forward and rearward members 48, 50 between end member 52 and inner member 56, and member 54 and inner member 58. As should be apparent from the figure, lower layer 64 does not extend between inner members 56, 58 which, together with rearward and forward members 48, 50 and upper layer 44 form a cavity 66 which is accessible from beneath the room floor, as best seen in FIG. 2. This cavity 66 also accommodates a drive mechanism according to the present invention as further described below.

As shown in FIG. 3, a drive mechanism generally indicated by the numeral 70 generally includes a support rail 72 and a drive guide 74. Support rail 72 is mounted within cavity 66 and is mounted to the bottom of the slide-out room 30, and in particular to the lower surface of upper layer 44 of floor 40. Drive guide 74 is mounted to the upper surface of main room floor 22. As further described below, when room 30 is moved between the extended and retracted positions, support rail 72 moves through drive guide 74.

Figure 4:
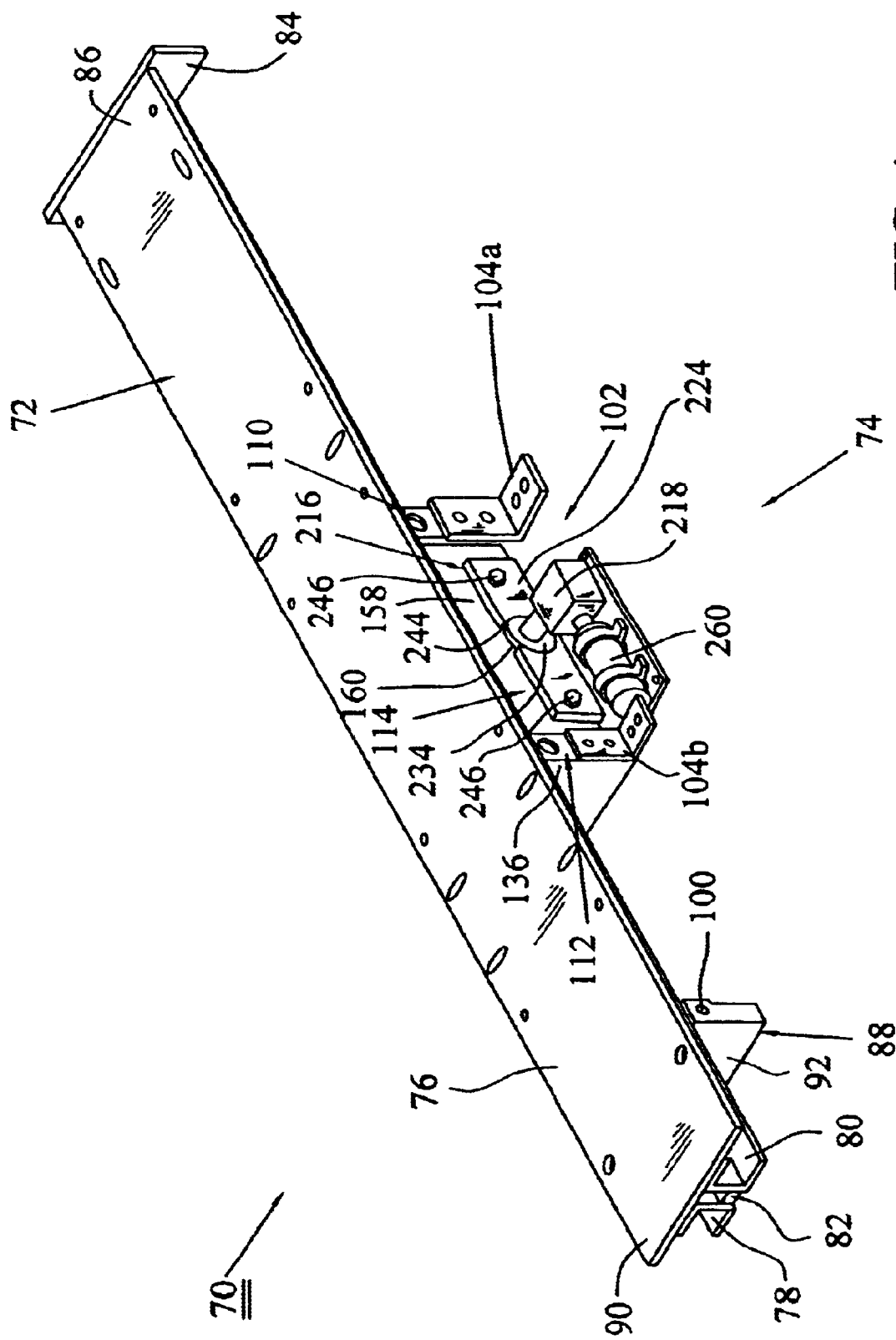
FIG. 4 is a perspective view of the drive mechanism.
Figure 5:
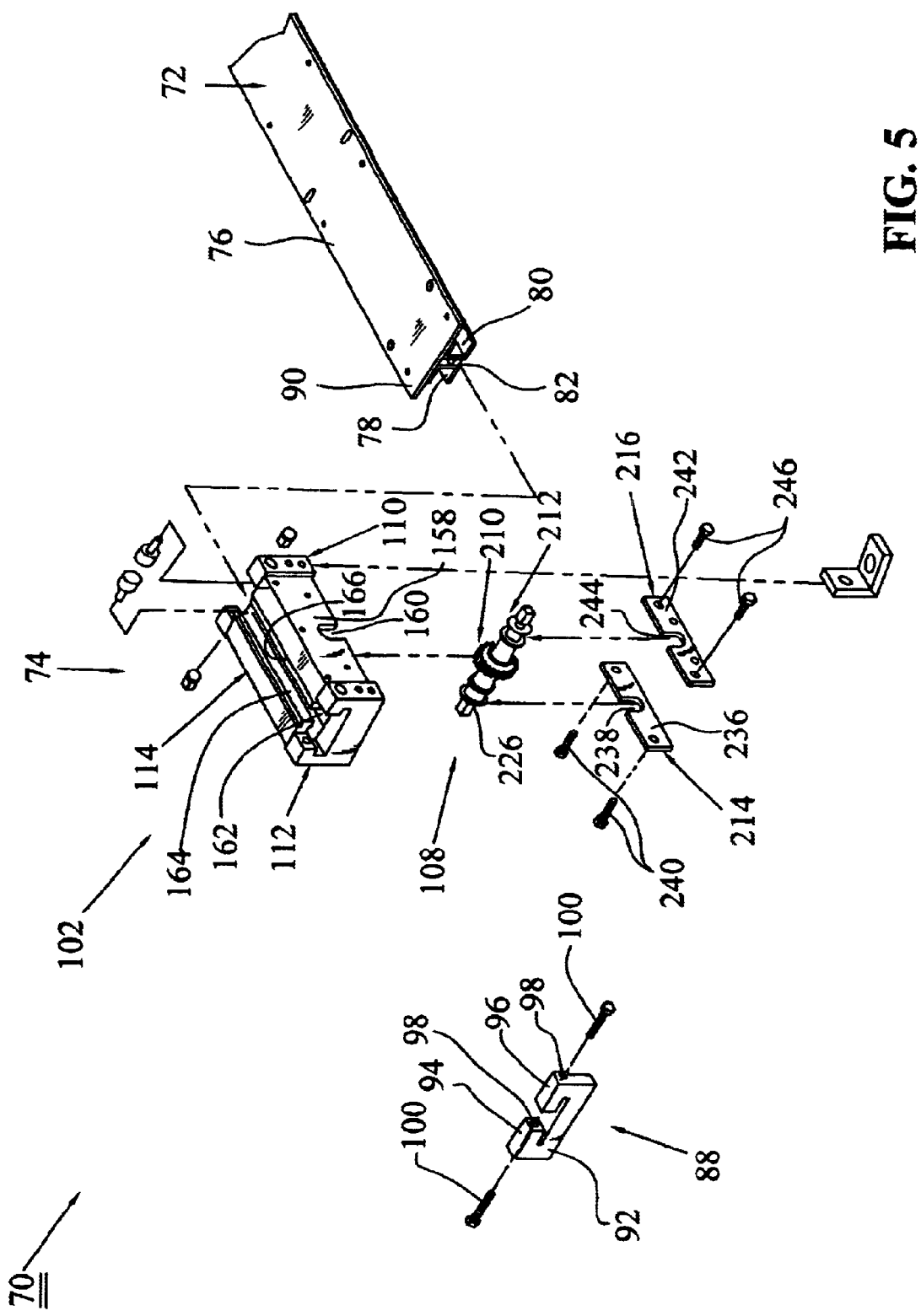
FIG. 5 is an exploded view of the drive mechanism shown in FIG. 4.

Referring now to FIGS. 4 and 5, support rail 72 includes a mounting plate 76 having a plurality of openings for attaching plate 76 to upper layer 44 of floor 40, a pair of U-shaped channels 78, 80, and a rack 82. Channels 78, 80 are attached to plate 76 such that they open away from one another, and extend substantially the entire length of plate 76. Rack 82 also extends substantially the entire length of plate 76, and is situated between channels 78, 80 as shown in the figures.

Support rail 72 further includes a bracket 84 mounted to one end 86 of plate 76, and a stop 88 received by channels 78, 80 at the other end 90 of plate 76. Bracket 84 includes openings (not shown) for receiving fasteners (not shown) to attach bracket 84 to rearward member 48 (FIG. 3). As shown in FIG. 5, stop 88 includes a body 92 extending between a pair of opposed arms 94, 96, where each of arms 94, 96 have threaded bores 98 for receiving screws 100. Stop 88 is sized such that arms 94, 96 fit within channels 78, 80. Stop 88 may be moved along the length of channels 78, 80 to a desired position, and locked in place by turning screws 100 into bores 98 so that screws 100 engage channels 78, 80, and act as set screws to fix the stop 88 to channels 78, 80 and to thereby limit the outward travel of support rail 72 relative to drive guide 74 as further described below.

Figure 5A:
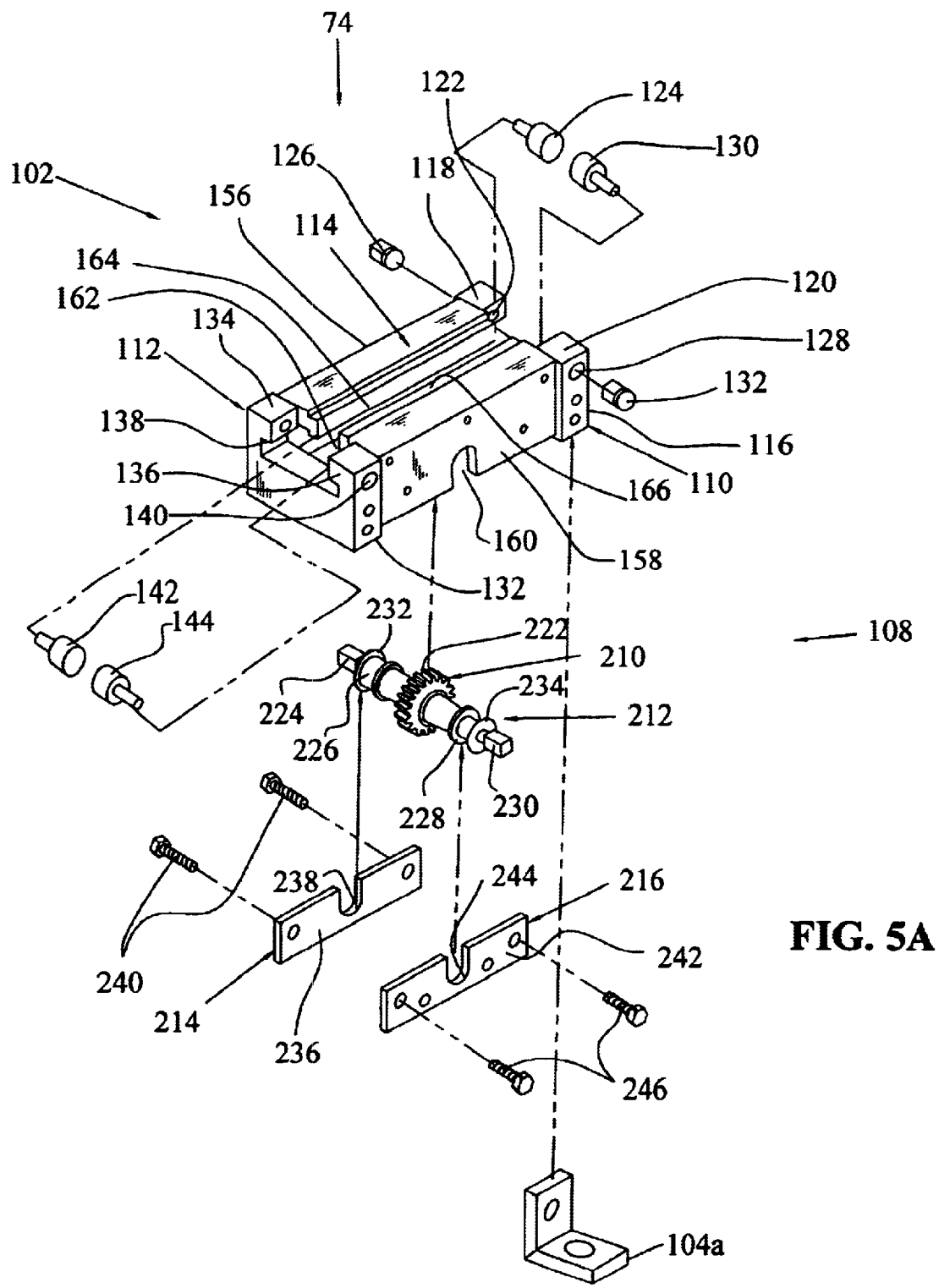
FIG. 5A is an enlarged view of the drive guide shown in FIG. 5.

Drive guide 74, as shown in FIGS. 4, 5 and 5A, generally includes a housing 102, mounting brackets 104A and 104B, and a gear assembly 108. As shown best in FIG. 5A, housing 102 includes a forward support 110, a rearward support 112, and a central portion 114, where supports 110, 112 are substantially identical. Forward support 110 includes a body 116 and a pair of opposed arms 118, 120. Arm 118 includes a bore which receives a roller 124 through one end and a lock nut 126 through the other end. Arm 120 also includes a bore 128 which receives a roller 130 through one end and a lock nut 132 through the other end. Rollers 124, 130 are spaced apart and axially aligned to be received within channels 78, 80, respectively. Rollers 124, 130 are movably mounted to arms 118, 120 such that rollers 124, 130 rotate as support rail 72 moves through guide 74.

Rearward support 112 similarly includes a body 132, a pair of opposed arms 134, 136 with bores 138, 140, respectively, rollers 142, 144 and lock nuts (not shown, but identical to lock nuts 126, 132) are all arranged in a substantially identical configuration as forward support 112 described above. Both forward support 110 and rearward support 112 are connected to central portion 114 such as with fasteners (not shown), welding, or other conventional connecting technique.

As also shown in FIG. 5A, central portion 114 includes side walls 156, 158, each including a notch (only notch 160 is shown), an inner wall 162, and a pair of opposed guide rails 164, 166 which are sized and positioned relative to one another and to upper wall 162 to fit through channels 78, 80 as slide rail 72 moves through guide 74. Side walls 156, 158 and inner wall 162 cooperate to form a space (not shown) within central portion 114 for receiving gear assembly 108. A drive opening (not shown) is formed in inner wall 162 between guide rails 164, 166. A portion of gear assembly 108 extends through this drive opening and engages rack 82 of slide rail 72 to move room 30 between the extended and retracted positions, as will be further described herein.

Gear assembly 108 generally includes a pinion gear 210 mounted to a shaft 212, and a pair of retainers 214, 216, only one of which is shown in FIG. 4. Pinion gear 210 includes a plurality of radially extending teeth 222 which extend through the opening (not shown) through inner wall 162 of housing 102 to mesh with teeth 220 of rack 82 (FIG. 1) when gear assembly is mounted within housing 102. Shaft 212 includes a first rectangular end 224, a first axle portion 226, a second axle portion 228, and a second rectangular end 230. A first washer 232 separates first end 224 from first axle portion 226, and a second washer 234 separates second end 230 from second axle portion 228. Axle portions 226, 228 have diameters which are slightly smaller than the inside dimensions of notches 160 formed in housing side walls 156, 158.

Retainer 214 includes a plate 236 having a notch 238 sized to receive first axle portion 226 of shaft 212. Plate 236 also includes openings for receiving fasteners 240 for attaching retainer 214 to housing side wall 156. Retainer 216 similarly includes a plate 242 having a notch 244 and openings for mounting plate 242 to housing side wall 158 with fasteners 246. As best shown in FIG. 4, when retainers 214, 216 are attached to housing 102, shaft 212 of gear assembly 108 extends through notches 238, 244 of retainers 214, 216, respectively, and notches 160 of side walls 156, 158, and is supported for rotation within housing 102. Washers 232, 234 have diameters which are larger than the inside dimensions of notches 238, 244, respectively, and prevent lateral movement of shaft 212 within housing 102.

Figure 4A:
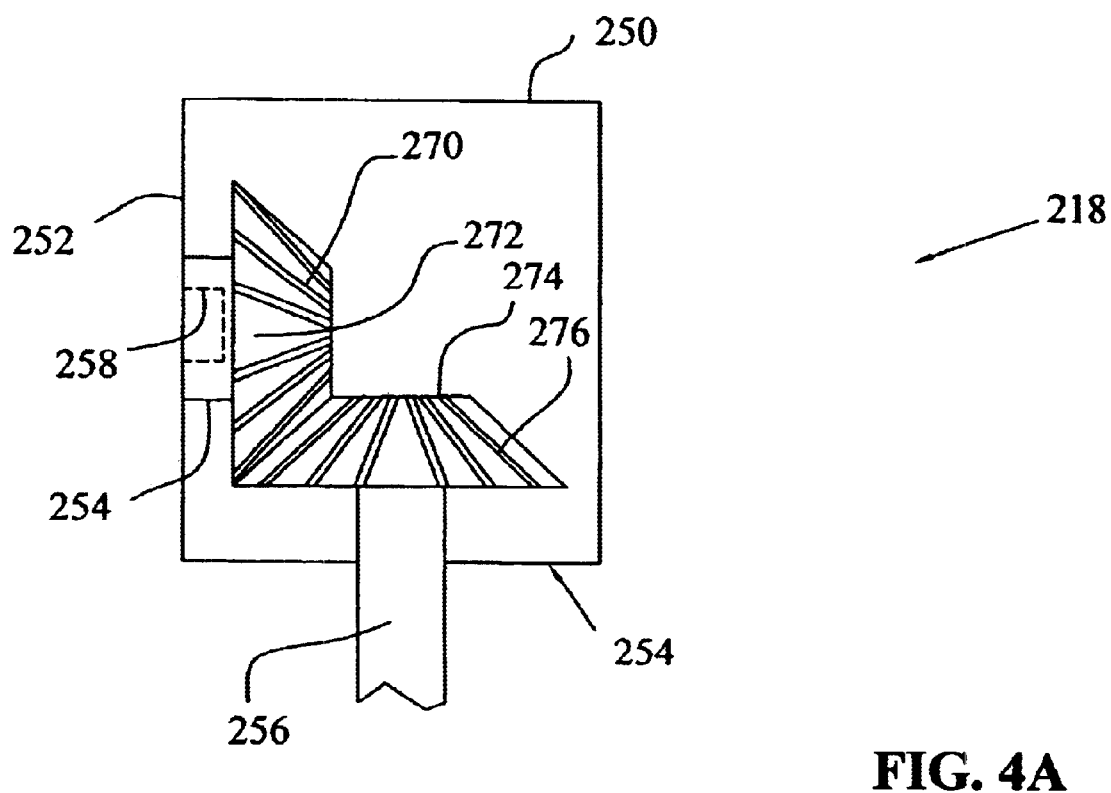
FIG. 4A is a diagrammatical view showing the motor and gear box assembly.
Figure 4A:
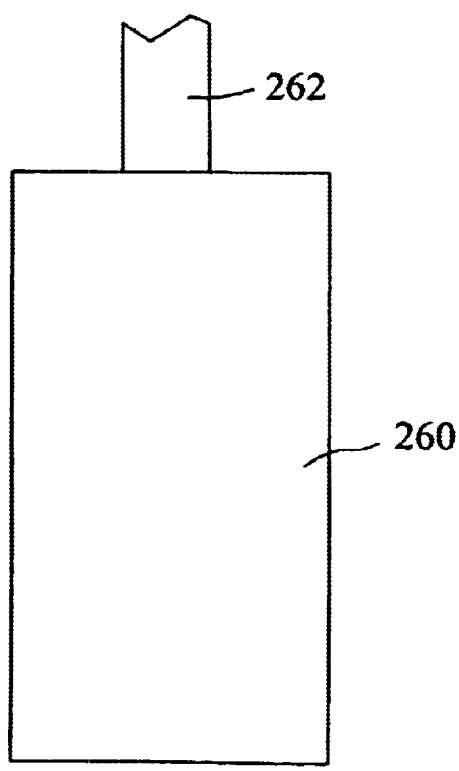

Finally, power is delivered to the drive guide 74 through bevel gear box 218, driven by motor 260. As shown in FIG. 4A, bevel gear box 218 includes a gear box housing 250 including side walls at 252 and 254, which include openings positioned adjacent to stub shaft 254 and gear shaft 256. Stub shaft 254 includes a square drive aperture 258 profiled to receive square drive 230 (FIG. 5A), whereas drive shaft 256 will be interconnected to shaft 262 of motor 260. It should be appreciated that stub shaft 254 is integrally formed with (or is keyed to) a bevel gear 270 having teeth 272, while shaft 256 is integrally formed with (or is keyed to) a bevel gear at 274 having teeth 276. As should be appreciated from those skilled in the art, bevel teeth 276 and 272 will mesh, such that a rotational input to shaft 256 will cause a right-angle drive output to square drive 230 to drive the shaft 210. It should be appreciated that a second motor and gear box similar to that shown in FIG. 4 as reference items 260 and 218 will be positioned on the opposite side of the drive guide 74 for coupling to shaft end 224. It should be appreciated that, this motor and gear box, when connected to drive end 224, drives the shaft 210 in the same sense as motor 260 and gear box 218. As should be appreciated, this could either be accommodated by applying an opposite polarity to the motor, or alternatively, by providing a different gearing within the gear box 218. What is to be understood is that two motors similar to 260 and two drive boxes similar to 218 are positioned on opposite sides of the drive guide 74 with each providing an output to shaft ends 224 and 230 to drive the shaft 210 in the same rotational sense.

With the drive mechanism as above described, the operation of the drive mechanism relative to the slide-out room will be described relative to FIGS. 6A and 6B. As mentioned above, the drive guide 74 is fixed to the main room floor 22, whereas the slide mechanism 72 is attached to the bottom side of the slide-out room floor 40. Thus, actuation of the motors 260 causes a driving engagement between gear teeth 222 of shaft 210 and teeth 220 (FIG. 2) of the rack 82 (FIG. 4) and thus driving movement to the fully extended position as shown in FIG. 6A. It should also be appreciated that the support rail 72 slides along rolling support through rollers 124, 130, 142, 144 such that the rail support 72 can be both moved to the fully extended position and be held in place in the full cantilevered position. As should be appreciated, reversing the motors 260 causes a reversal of the shaft 210, thereby driving the slide-out room to its fully retracted position as shown in FIG. 6B.

Figure 7A:
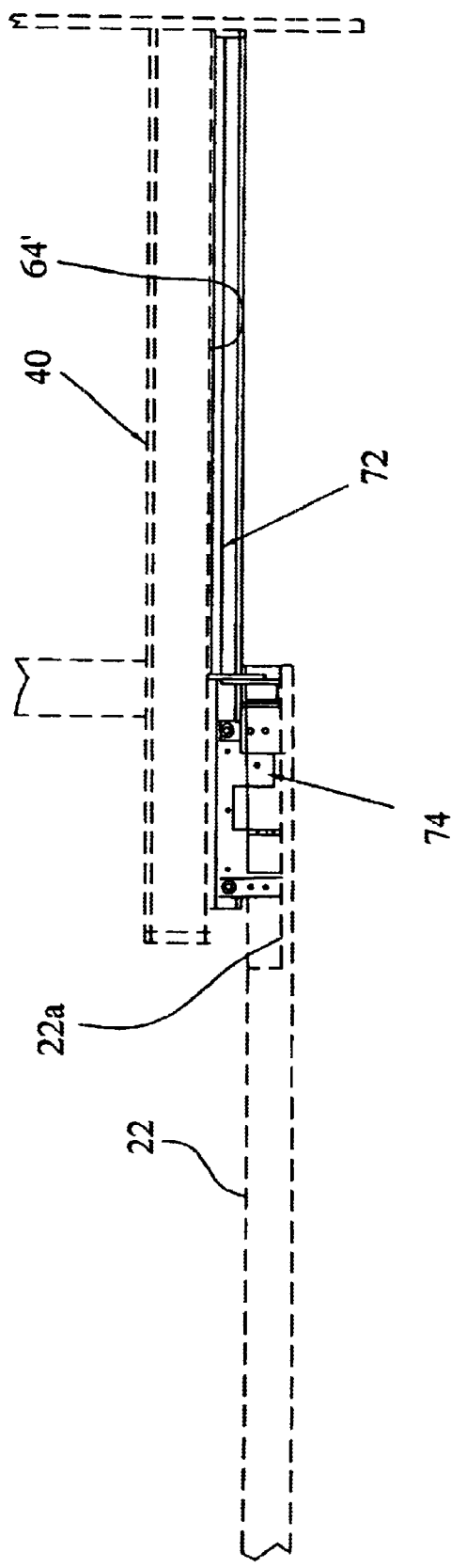
FIGS. 7A and 7B show side views similar to those shown in FIGS. 6A and 6B, respectively, where the drive mechanism is mounted in an alternate manner.
Figure 7B:
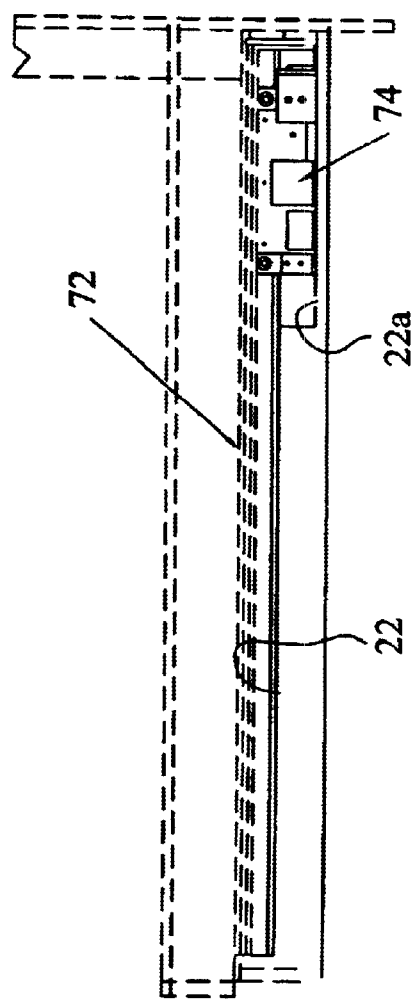

With respect now to FIGS. 7A and 7B, the support rail 72 and drive guide 74 can be mounted such that the drive guide 74 is mounted in a recess 22A of the main room floor 22, whereas the support rail 72 is mounted to the bottom of the slide-out room floor 40, that is, to a bottom panel 64' which spans the entire width of the slide-out room floor. Thus, the support rail 72 would not be mounted within the slide-out room floor as discussed relative to FIG. 3, but rather the slide-out room floor is mounted on the top of the support rail. As shown in FIGS. 7A and 7B, the exact same operation is provided, whereby the support rail 72 and drive guide 74 can accommodate the slide-out room between the fully extended positions of FIG. 7A, and the fully retracted positions of FIG. 7B.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An actuator member for moving an expandable room portion between fully extended and fully retracted positions in a vehicle room, comprising:

an elongate support rail mountable to the slide-out room floor, said support including guide ways extending over a substantial length of said elongate support rail;

a drive guide mechanism mountable to a fixed room floor of said vehicle room, having first and second members receivable in said guide ways, and spaced apart along an axis of movement of said support rail;

a power drive mechanism positioned adjacent said drive guide mechanism;

a first drive mechanism rotatably positioned in said drive guide mechanism, and coupled to said power drive mechanism; and a second drive mechanism fixed to said support rail and driven by said first drive mechanism.

2. The actuator of claim 1, wherein said power drive mechanism is comprised of at least one motor.

3. The actuator of claim 2, wherein said power drive mechanism is comprised of a plurality of motors.

4. The actuator of claim 3, wherein said power drive mechanism is comprised of twin motors.

5. The actuator of claim 4, wherein said support rail is comprised of a mounting plate with channels positioned on a lower surface with elongate openings facing outwardly.

6. The actuator of claim 5, wherein said drive guide mechanism comprises first and second sets of rollers profiled for receipt in said channel.

7. The actuator of claim 6, wherein said first drive mechanism is a pinion gear mounted to a rotatable shaft, mounted with an axis of rotation transverse to the axis of movement of said support rail.

8. The actuator of claim 7, wherein said second drive mechanism is a rack gear positioned intermediate said channels.

\* \* \* \* \*